United States Patent [19]

Lewis

[11] 4,170,347

[45] Oct. 9, 1979

[54] WEB PLEATER

[75] Inventor: Robert B. Lewis, Newark, Del.

[73] Assignee: E. I. Du Pont de Nemours and Company, Wilmington, Del.

[21] Appl. No.: 907,279

[22] Filed: May 18, 1978

Related U.S. Application Data

[63] Continuation-in-part of Ser. No. 808,996, Jun. 22, 1977, abandoned.

[51] Int. Cl.² .............................................. B65H 45/22
[52] U.S. Cl. ........................................ 270/94; 270/69; 93/84 FF
[58] Field of Search ...................... 270/69, 79, 86, 94; 93/84 R, 84 FF, 84 TW; 223/28, 32, 33

[56] References Cited

U.S. PATENT DOCUMENTS

| | | | |
|---|---|---|---|
| 2,848,820 | 8/1958 | Wallin | 34/23 |
| 3,070,901 | 1/1963 | Allander | 34/156 |
| 3,111,310 | 11/1963 | Dutro | 270/86 |
| 3,150,576 | 9/1964 | Gewiss | 93/84 R |
| 3,180,688 | 4/1965 | Futer | 302/29 |
| 3,181,916 | 5/1965 | Epstein | 302/29 |
| 3,348,458 | 10/1967 | Tipper | 93/84 R |
| 3,452,447 | 7/1969 | Gardner | 34/156 |
| 3,705,676 | 12/1972 | Overly | 226/97 |
| 3,831,501 | 8/1974 | Bevington | 93/84 FF |
| 3,999,806 | 12/1976 | Hurd | 302/28 |
| 4,008,591 | 2/1977 | Vos | 72/38 |

Primary Examiner—Edgar S. Burr
Assistant Examiner—A. Heinz

[57] ABSTRACT

A material transporting device is disclosed wherein a web material is pneumatically moved between mating, irregular louvered surfaces and pleated to exit from the device in a narrowed pattern. Use of the device is particularly directed to rapid handling of scrap web material.

13 Claims, 14 Drawing Figures

WEB PLEATER

This is a continuation-in-part application of Ser. No. 808,996, filed June 22, 1977, now abandoned.

In manufacturing and handling webs of flexible material, simple and rapid removal of scrap is very important to efficient operation. In fact, the rate of manufacture or handling of wide webs of film material is often controlled by the ease with which scrap can be removed in case of a break in the web. Such removal, in the case of film web handling, includes a collapse or convergence of the web into a narrower form. For some film webs, particularly of heavy material, it has been found that pleating the web results in effective collapse and convergence. This invention, thus, relates to pleating webs of material and to devices for performing the pleating.

Pneumatic transport of webs, parts of webs, or small articles has been previously disclosed.

U.S. Pat. No. 3,070,901, for example, discloses that webs can be guided along a certain path by means of a plurality of individual blower devices, some directing air transverse to the direction of travel. Louvers disclosed in that patent extend across the device and there is no disclosure of web material pleating.

U.S. Pat. No. 3,705,676 discloses a conveyor which utilizes widely spaced air nozzles extending across an otherwise closed plenum chamber. The device is disclosed to be useful for removing web trim and for threading paper ribbon to start a paper machine. There is no disclosure of wide web transport or material pleating.

U.S. Pat. No. 2,848,820 pertains to a web conveying device utilizing force from a gaseous medium. The device includes ducts for the gaseous medium having apposing vented faces forming a channel through which a web is conveyed. Louvers are not specifically disclosed and there is no hint of web pleating.

U.S. Pat. No. 3,180,688 pertains to a conveyor with an air feed plenum having both perforations and slits, to provide lift and propulsion, respectively, to materials transported in the conveyor. The conveyor is walled with an open top. There is no web pleating.

U.S. Pat. No. 3,181,916 pertains to a conveyor for small articles and includes an air plenum with one louvered surface. The louvered surface is walled with an open top and serves as the floor for article conveyance. There is no web material conveyance and no hint that webs, if conveyed, could be pleated.

U.S. Pat. No. 3,999,806 describes an air-driven conveyor for individual parts or articles wherein there are integral Y-shaped spur sections in the conveyor. The conveyor includes a deck with an underlying plenum section and holes in the deck, of certain configuration. The deck, in straight sections of the conveyor, includes a combination of lifting holes and propulsion slots and the spur sections have only propulsion slots. There is no mention of web transport or of pleating of materials transported.

According to the present invention, there is provided a pleating device comprising: a first air feed plenum having an inlet end and an outlet end, a transversely irregular surface on the first plenum, flat at the inlet end and progressing over the length of the surface to at least one peak at the outlet end; a second air feed plenum having an inlet end and an outlet end, a transversely irregular surface on the second plenum, mating with the surface of the first plenum and juxtaposed in a spaced-apart relation thereto; a multitude of slots with louvered openings in each irregular surface, said louvered openings directed toward the outlet ends. A process is provided for pleating a moving web of material comprising applying longitudinal pneumatic force to a wide web of the material to hold the web under tension; applying transverse pleating forces to the web under tension over a predetermined length of the web to collapse the wide web into a pleated structure; moving the web in the direction of the tension to continually apply longitudinal and transverse forces to the moving web; whereby the wide web is continually collapsed to a pleated structure.

Embodiments of the invention are illustrated in the accompanying drawings wherein.

Figure 1A:
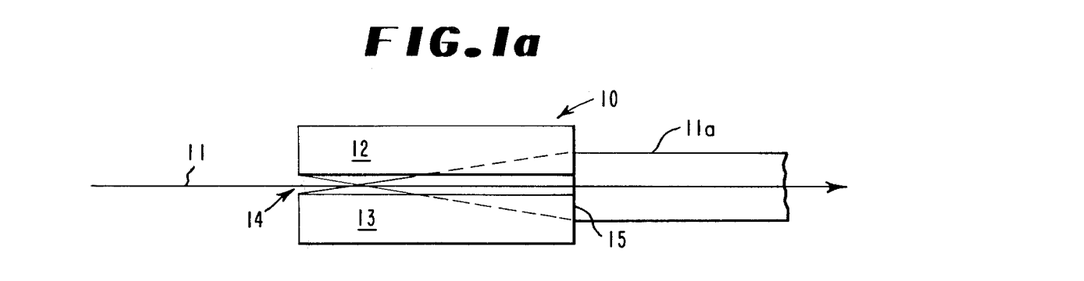
FIG. 1(a) is a side view representation of a web pleater of this invention.
Figure 1B:
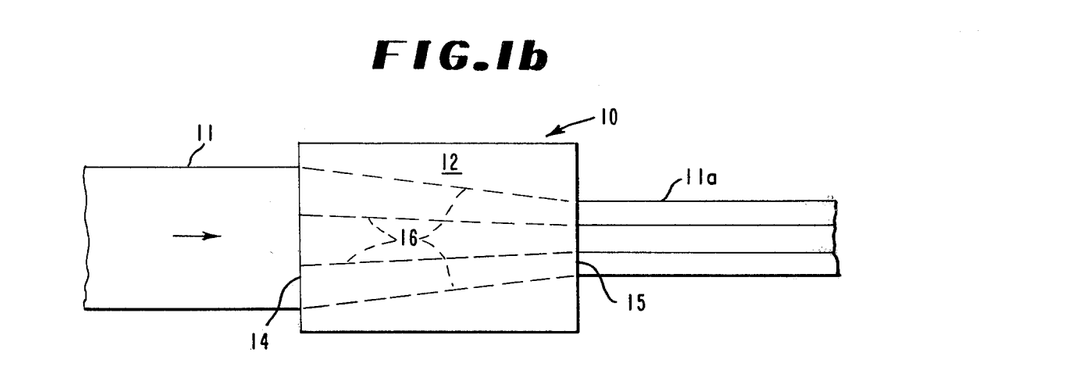
FIG. 1(b) is a top view representation of a web pleater of this invention.

Referring to FIGS. 1(a) and 1(b), web pleater 10 is shown in a simplified representation with flat web 11 entering the pleater and collapsed, pleated, web 11(a) leaving the pleater.

FIG. 1(a) represents a side view of pleater 10 including first air feed plenum 12 and second air feed plenum 13. The air feed plenums are juxtaposed in spaced-apart relation to leave a channel denoted by inlet end 14 and outlet end 15. Flat web 11 enters pleater 10 at inlet end 14. As the web is transported through pleater 10, it is, itself, pleated and emerges at outlet end 15 as pleated web 11(a).

FIG. 1(b) represents a top view of pleater 10 looking down on air feed plenum 12. Phantom lines 16 indicate the location of pleats formed in flat web 11 as it progresses through the channel from inlet end 14 to outlet end 15 emerging as pleated web 11(a).

Figure 2:
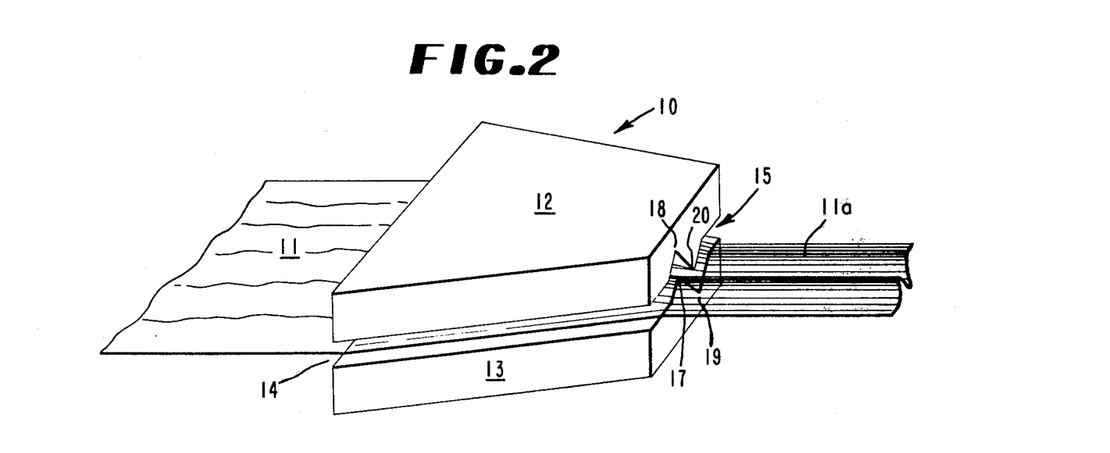
FIG. 2 is a perspective view of a web pleater of this invention.

FIG. 2 is a perspective representation of web pleater 10 with flat web 11 passing into inlet 14 and pleated web 11(a) passing out of outlet end 15. Air feed plenum 12 and air feed plenum 13 are juxtaposed and having apposing surfaces which are fan pleated commencing at the inlet end with a flat surface and progressing to the outlet end with full surface pleats. The pleats of each surface mate in a spaced-apart relation. Pleat trough 18 and pleat peak 20 in plenum 12 mate with pleat peak 17 and pleat trough 19 in plenum 13 to yield a channel for the transport of web material.

Figure 3:
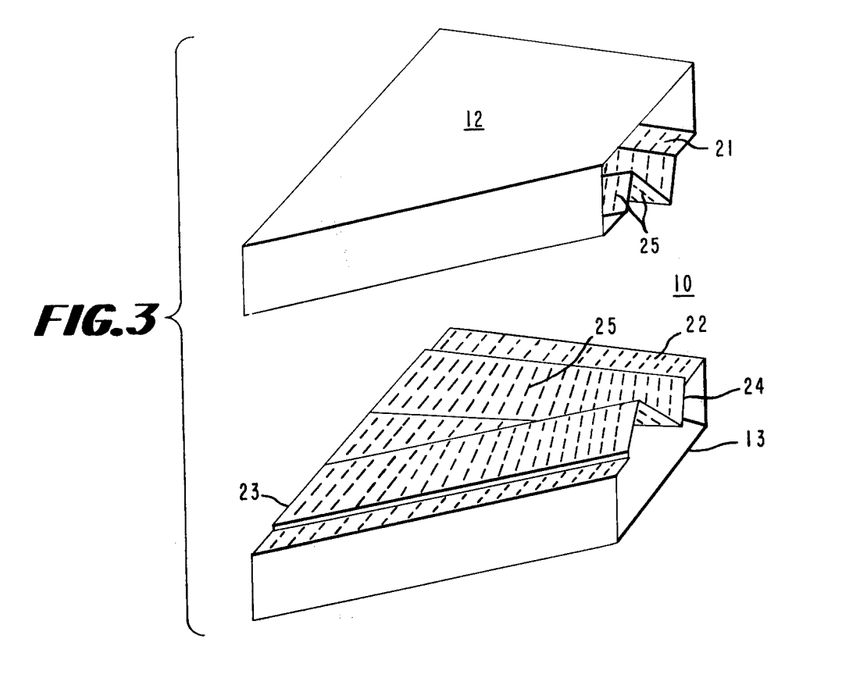
FIG. 3 is an exploded perspective view of a web pleater of this invention.

FIG. 3 is an exploded perspective representation of web pleater 10 showing air plenums 12 and 13 with transversely irregular surfaces 21 and 22. While a variety of transversely irregular surfaces 21 and 22 can be utilized, for purposes of description, the surfaces shall be sometimes characterized herein as fan pleated. The inlet edge 23 of surface 22 on plenum 13 is substantially flat. The outlet edge 24 of surface 22 on plenum 13 is irregular. Surface 22 is, thus, pleated with folds which commence at the inlet edge 23 and progress over the length of surface 22 to the outlet edge 24. Such fan pleated surface 22 of plenum 13 is matched by fan pleated surface 21 of plenum 12 to mate therewith when the plenums are juxtaposed in surface-to-surface spaced-apart relation.

Although not a requirement of the pleating device of this invention, it is preferred and generally the case that the distance along the flat inlet edge of a fan pleated surface is about equal to the distance along the pleated outlet edge of that surface.

Fan pleated surfaces 21 and 22 are shown with a representation of slots 25 cut into the surface. Slots 25 are used to direct a gas flow from inside plenums 12 and 13 along the surfaces 21 and 22 toward the outlet edges of those surfaces. Gas, thus-directed, exerts transporting forces on web material located between the plenums. Web material, under the influence of the gas transporting forces, is contacted by the pleated plenum surfaces which exert transverse forces on the web to cause orderly web collapse, herein termed pleating.

The source of gas and pressure means for directing the gas are not shown. Gas can be supplied by fans or other means and can be introduced into the plenums by any means and at any locations. The plenums can have closed ends as shown in FIG. 2 or open ends as shown in FIG. 3. Web pleating plenums having open ends can be operatively joined with plenums from other pneumatic web conveying devices. The plenums must be otherwise sealed to permit an inside-to-outside pressure differential adequate to maintain flow of gas through the slots at a velocity greater than the intended web velocity for web transport. Gas supply can be introduced at a plenum end or through holes in any flat plenum surface. Gas supply and gas velocity should be adjusted to be nearly the same for mating plenums in order to balance forces on web material in the channel between the plenums.

If desired or required, vents or other openings for emergent gas can be provided in addition to the slot openings. For example, the web pleater can be joined with pneumatic conveyors which conveyors can supply gas pressure at the pleater inlet ends and can utilize gas pressure at the pleater outlet ends.

Figure 4:
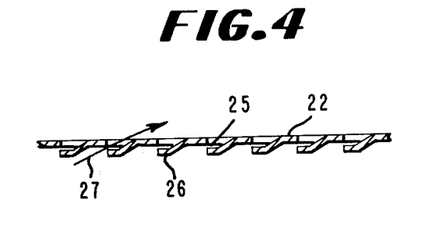
FIG. 4 is a cross-sectional view of a louvered portion of a web pleater of this invention.

FIG. 4 shows a cross-sectional view of a representative fan pleated surface of a web pleater, for example, surface 22, sectioned through slots 25. Arrow 27 indicates the direction of gas flow and consequent direction of web transport under operational gas pressure. Lip 26 is material from surface 22 deformed to yield slot 25 for directing gas flow.

Figure 5:
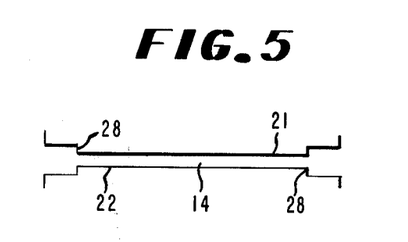
FIG. 5 is a view of the inlet end of a web pleater of this invention.

FIG. 5 is a representation of a shape for an inlet end 14 of a web pleater of this invention. The inlet end 14 is bounded by flat inlet edges of plenum surfaces 21 and 22 and represents the channel for introducing flat web into the web pleater. While not necessary for operation of the web pleater, it is sometimes advantageous to locate shoulders 28 at each end of inlet 14. Edges of some scrap web material are sometimes stiff and unmanageable and provision for enlarged edge channels over the length of the pleating device accommodates such stiff material.

Figure 6:
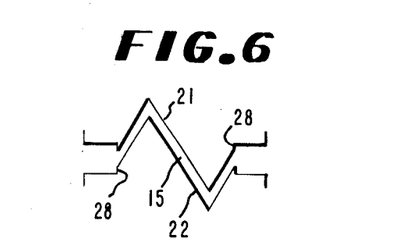
FIG. 6 is a view of the outlet end of a web pleater of this invention.

FIG. 6 is a representation of a shape for an outlet end 15 of a web pleater of this invention. The outlet end 15 is bounded by pleated outlet edges of plenum surfaces 21 and 22 and represents the channel for releasing pleated web from the web pleater. The channel of this FIG. 6 exhibits two peaks and results in collapse of a flat web to about one-half of its original width. The degree of flat web collapse depends, generally, upon the number of peaks and the length of channel between peaks.

Figure 7:
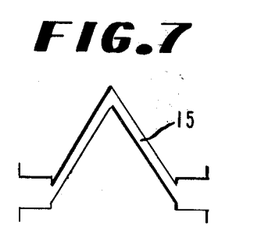
FIGS. 7–10 are views of additional outlet ends of web pleaters of this invention.

FIG. 7 is a representation of an outlet end 15 having one peak and resulting in collapse of a flat web to about one-half of its original width.

Figure 8:
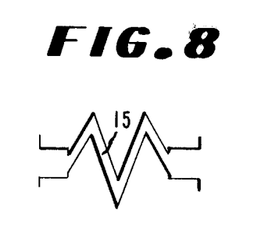
Figure 9:
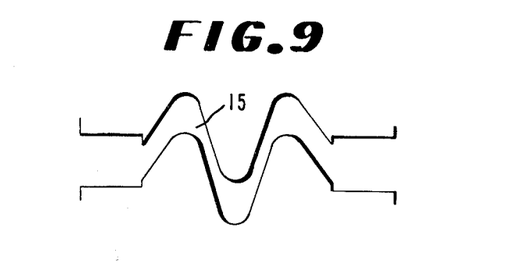
Figure 10:
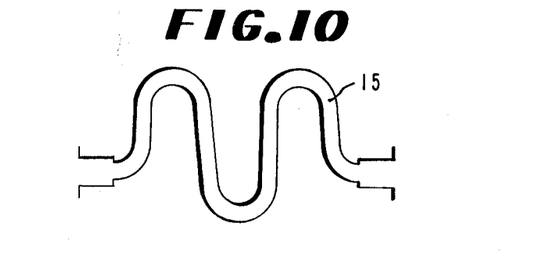

FIG. 8 is a representation of an outlet end 15 having three peaks and FIG. 9 is a similar representation demonstrating that the peaks can be truncated or rounded. FIG. 10 is a representation of an outlet end 15 having three peaks in a channel made from circular elements.

Figure 11:
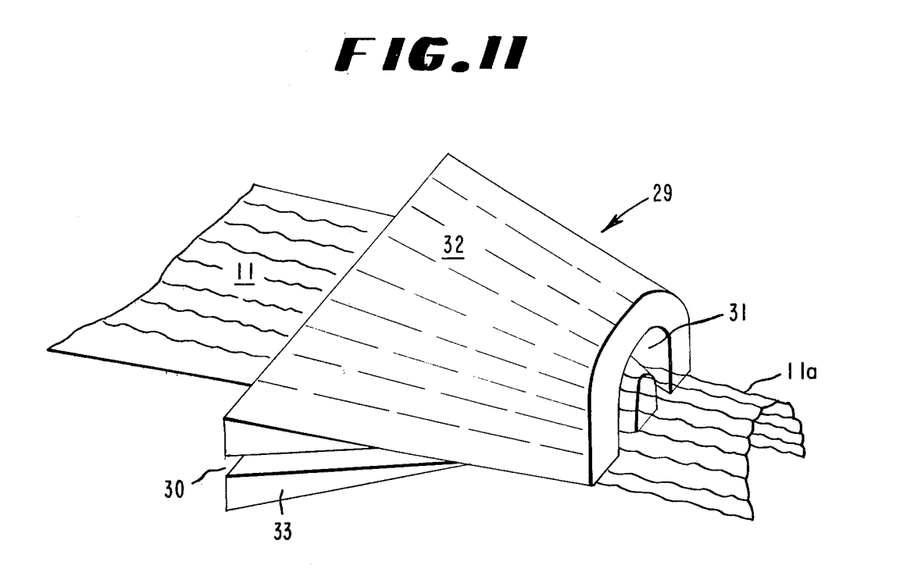
FIG. 11 is a perspective view of another web pleater of this invention.

FIG. 11 is a perspective representation of a web pleater 29 with flat web 11 passing into inlet end 30 and pleated web 11(a) passing out of outlet end 31. Air feed plenum 32 and air feed plenum 33 are juxtaposed and have apposing surfaces with a single, round, pleat commencing at inlet end 30 with a flat surface and progressing with increasing curvature to the outlet end 31. Air plenum 32, at the outlet end 31, is shown to have an inverted "U" shape. Air plenum 33, at the outlet end 31, is shown to be a solid shape with one surface rounded to mate with the apposing surface of plenum 32. The solid shape could, of course, be an inverted "U" shape. Air plenums 32 and 33, at the outlet end 31, can have more than one peak, such as by having the shape of an "M".

Figure 12:
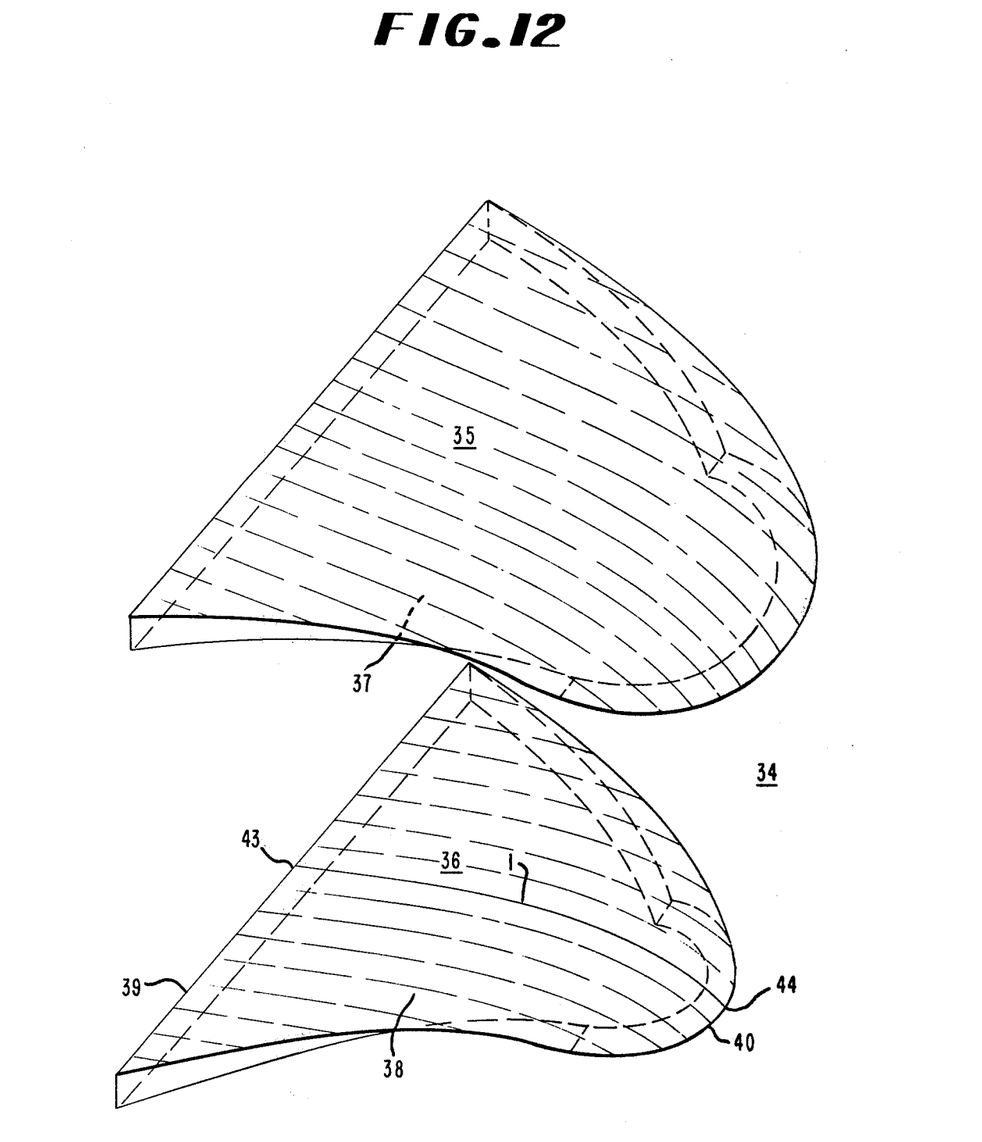
FIG. 12 is an exploded perspective view of a web pleater of this invention having compound surfaces.

FIG. 12 is an exploded perspective representation of a web pleater 34 showing air plenums 35 and 36 with transversely irregular surfaces 37 and 38. Transversely irregular surfaces 37 and 38 have compound curves wherein the transverse pleating curve progressively increases over the length of the surfaces and the surfaces themselves are curvilinear along their length. By curvilinear, is meant that a line 1 from a point 43 along inlet edge 39 to a corresponding point 44 along outlet edge 40 is a curved line. In this drawing, to enable more complete understanding, phantom lines are inserted to provide indication of all edges of the pleater. The inlet edge 39 of surface 38 on plenum 36 is substantially flat; and the outlet edge 40 of plenum 36 is irregular and directed in a plane different from that of the inlet edge 39. Surface 38 is, thus, pleated with a single, rounded, pleat in a compound curvilinear surface which commences at the inlet edge 39 and progresses over the length of surface 38 to the outlet edge 40. Such pleated surface 38 of plenum 36 is matched by pleated surface 37 of plenum 35 to mate therewith when the plenums are juxtaposed in surface-to-surface spaced-apart relation. A web to be collapsed, when transported through the assembled pleater of FIG. 12, is pleated into the shape of an inverted "U" and is also twisted into a different plane.

Figure 13:
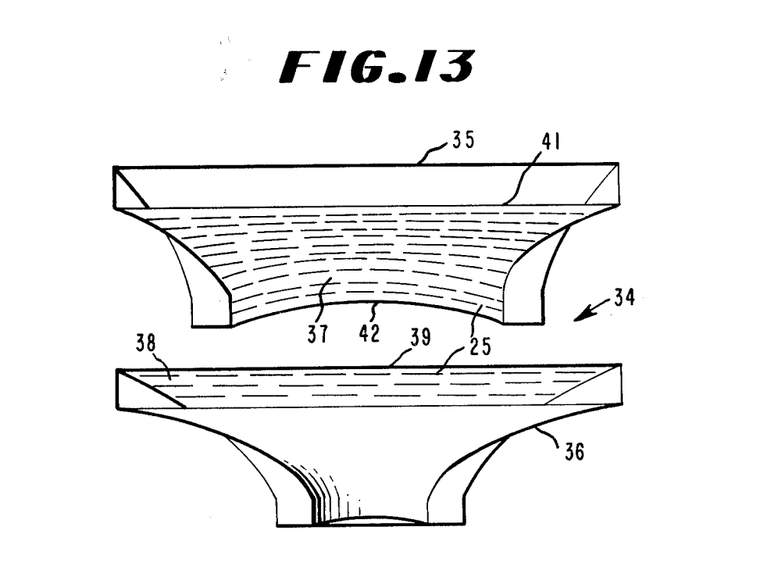
FIG. 13 is an exploded end view of the device of FIG. 12.

FIG. 13 is an exploded end view representation of web pleater 34 in FIG. 12. Plenums 35 and 36, with surfaces 37 and 38 having slots 25 cut therein, are mounted with surfaces 37 and 38 in parallel spaced-apart relation such that when a web is introduced between inlet edges 41 and 39 and when air is directed through the plenums 35 and 36, the web is drawn between and along surfaces 37 and 38 and is simultaneously pleated and curved downward to collapse the web and alter its direction.

The transversely irregular, pleated surfaces of this invention can include one pleat or several and the pleats can be peaked with sharp edges or can be truncated or round.

In operation, a gas pressure is provided in the plenums of the pleater by means of fans or the like. For reasons of economy, air is the gas most often used although any other suitable gas or combination of gases would be effective. Additives can be combined with the gas to accomplish some treatment and the gas can be heated or cooled to alter temperatures or to dry pleated material.

Web transport, in the case of scrap removal, can be required to be as great as about 1000 meters per minute. Due to the ease of web handling provided by the device of this invention, the device is also useful at low web transport speeds, for instance, as slow as about 15 meters per minute.

The web pleater of this invention is self-starting. Introduction of an end length of web material into the pleater commences collapse and transport of the web. Such self-starting is an important feature where nearly instantaneous web scrap removal is necessary in high speed film handling processes.

Pleating and transport of web materials can be conducted with the surface of the pleater in any attitude—vertical, horizontal, or any intermediate position—and in a flat or curvilinear shape.

Louvers in the surface of the plenums are formed from slots cut in the surface and opened in the direction of intended material travel. Louvers direct the gas nearly flat along the surface. The louver openings are preferably below and are nearly perpendicular with the surface. Arrays of louvers can be in any pattern and can have any length and spacing within the following general limits: The louvers are less than 25 centimeters and preferably from 2 to 15 centimeters long. The length of the louvers is less than one-fourth the width of the total surface. Each louver should have more than one neighboring louver at least one-fourth louver length but less than three louver lengths away.

Louver length and spacing is important to maintain a stable and rapid movement of web material. Louvers which are too long or which are spaced too closely permit an excessive flow of gas from the plenum resulting in excessively reduced gas pressure farther along the plenum. Such excessively reduced gas pressure provides inadequate force for continued pleating and transport of the material. Louvers which are too short or which are spaced too far apart prevent gas flow adequate to provide material pleating and transport.

As a general rule, louvers at the inlet end of the pleater should be relatively closer together than louvers at the outlet end. Such progressively greater spacing between louvers is believed to aid in balancing gas flow through the pleater and in developing a higher initial tension in web material entering the pleater. Care must be exercised, however, to maintain adequate gas flow at the pleat peaks and avoid excessive dragging contact between web and plenum surfaces.

Mating plenums spaced apart to make the web pleater of this invention are spaced near enough to afford adequate pneumatic transporting forces to move the web and are spaced far enough to provide room for movement of the web without hang-up in the plenum surfaces. The preferred distance between the plenums is different for different web materials and operating conditions. The distance can vary from one pleater to another within a range of about 2 to 25 centimeters. Distances of from 5 to 15 centimeters have been found particularly suited for pleating webs of polyethylene terephthalate from 25 to 350 microns in thickness. In the case of pleaters having compound surfaces, distances between the plenums can be as much as 40 centimeters. A distance of 30 to 35 centimeters has most often been used.

Web material which can be pleated and transported by the device of this invention includes fibrous material such as paper, metals such as aluminum foil, synthetic polymeric material such as polymer film and spunbonded polymer webs, and the like. The pleating device is particularly suited to pleating and transporting webs of material having indefinite length. While the webs which can be pleated are thick or thin, the preferred web material is relatively thick. Webs to be pleated must only exhibit adequate flexibility for transporting through the pleating device.

When it is desired to pleat a web and simultaneously twist the web out of its initial plane, pleaters having compound surfaces are useful and such pleaters are particularly useful when the web to be pleated and twisted is of a relatively thick material. Pleaters having compound surfaces are also particularly useful in collapsing webs which are not of uniform thickness or stiffness across the web. Such webs having especially thickened edges are more easily collapsed by a pleater having compound surfaces because the compound surfaces cause the web edges to be buckled and twisted about the longitudinal axis of the web.

As specific examples of the present invention, web pleaters having as few as one to as many as six or more pleats can be used to collapse webs of polyethylene terephthalate at least 350 microns (14 mils) thick. While web pleaters are useful for handling a wide range of materials, including films as thin as about 25 microns (1 mil), the web pleater of this invention finds particular application for pleating relatively heavy webs which are only difficultly collapsed by other means. Examples of such relatively heavy webs would be polyethylene terephthalate greater than about 125 microns (5 mils) thick and spun-bonded polypropylene fabric about 116 g/m$^2$ (3.5 ounces/yd$^2$) in weight.

A preferred slot configuration for the pleater involves slots about 5 centimeters long spaced 5 centimeters apart in the direction of web travel with slot ends 5 centimeters apart in the transverse direction. Louvers formed from slots in this configuration can have an opening about 0.15 centimeter wide.

The degree of web collapse, expressed as a ratio of initial web width to distance across a pleated web can be from two to greater than six. Other than as a matter of practicality, there do not appear to be actual limits to the ratio. With wide webs pleated over long distances or at sharp pleating angles, higher degrees of pleating can be obtained. For example, webs as wide as about 3.75 meters can easily be pleated to less than about 1 meter while being transported at more than 200 meters per minute.

The number of pleats to which a web is subjected for collapse is important only insofar as it is important to reduce the height of the pleated web. For example, a web which has one pleat emerges from the web pleater with a height equal to about one-half of the initial web width while a web with four pleats will have a height of only about one-fourth of the initial web width. Height of the pleated web is important on occasions wherein it is desired to introduce pleated scrap webs directly into a shredding or chipping device to comminute the scrap into an efficient form for recycling processes. In such a case, the pleated web must be of a size to fit into the mouth of the shredder or chipper.

I claim:

1. A pleating device comprising
   a first air feed plenum having an inlet end and an outlet end
      a transversely irregular surface on the first plenum, flat at the inlet end and progressing over the length of the surface to at least one peak at the outlet end
      a multitude of louvers in the surface on the first plenum, said louvers being from 2 to 15 centimeters long which is less than one-fourth the width of the surface on the first plenum, spaced more than one-fourth and less than three louver lengths apart, and directed toward the outlet end
   a second air feed plenum having an inlet end and an outlet end
      a transversely irregular surface on the second plenum mating with the surface of the first plenum and juxtaposed in a spaced-apart relation thereto;
      a multitude of louvers in the surface on the second plenum, said louvers being from 2 to 15 centimeters long which is less than one-fourth the width of the surface on the second plenum, spaced more than one-fourth and less than three louver lengths apart, and directed toward the outlet end.

2. A pleating device comprising
   a first air feed plenum having an inlet end and an outlet end
      a fan pleated surface on the first plenum, flat at the inlet end and progressing over the length of the surface to at least one peak at the outlet end
      a multitude of louvers in the surface on the first plenum, said louvers being from 2 to 15 centimeters long which is less than one-fourth the width of the surface on the first plenum, spaced more than one-fourth and less than three louver lengths apart, and directed toward the outlet end
   a second air feed plenum having an inlet end and an outlet end
      a fan pleated surface on the second plenum mating with the surface of the first plenum and juxtaposed in spaced-apart relation thereto
      a multitude of louvers in the surface on the second plenum, said louvers being from 2 to 15 centimeters long which is less than one-fourth the width of the surface on the second plenum, spaced more than one-fourth and less than three louver lengths apart, and directed toward the outlet end.

3. The pleating device of claims 1 or 2 wherein the distance along the plenum inlet end is about equal to the distance along the plenum outlet end.

4. The pleating device of claims 1 or 2 wherein the plenum outlet ends have three peaks.

5. The pleating device of claims 1 or 2 wherein the mating first and second plenum surfaces are between about 2 and 40 centimeters apart.

6. The pleating device of claim 1 wherein the plenum outlet ends have a single peak.

7. The pleating device of claim 6 wherein the single peak is round.

8. The pleating device of claim 1 wherein the transversely irregular surfaces are cuvilinear along their length.

9. The pleating device of claim 8 wherein the plenum outlet ends have a single peak.

10. The pleating device of claim 9 wherein the single peak is round.

11. A web material waste handling apparatus comprising
    a wide web delivery means;
    a web pleating device operatively engaged with the wide web delivery means to receive and collapse wide web material comprising
       a first air feed plenum having an inlet end and an outlet end
          a transversely irregular surface on the first plenum, flat at the inlet end and progressing over the length of the surface to at least one peak at the outlet end
          a multitude of louvers in the surface on the first plenum, said louvers being from 2 to 15 centimeters long which is less than one-fourth the width of the surface on the first plenum, spaced more than one-fourth and less than three louver lengths apart, and directed toward the outlet end
       a second air feed plenum having an inlet end and an outlet end
          a transversely irregular surface on the second plenum mating with the surface of the first plenum and juxtaposed in a spaced-apart relation thereto;
          a multitude of louvers in the surface on the second plenum, said louvers being from 2 to 15 centimeters long which is less than one-fourth the width of the surface on the second plenum, spaced more than one-fourth and less than three louver lengths apart, and directed toward the outlet end.

12. A process for pleating a moving web of flexible material comprising:
    applying balanced longitudinal pneumatic forces to a wide web of the material over a predetermined length of the web to hold the web under tension while simultaneously
    applying transverse pleating forces to the web under tension over the predetermined length of the web to collapse the wide web into a pleated structure; and
    moving the web in the direction of the tension to continually apply balanced longitudinal and transverse forces to the moving web;
    whereby the wide web is continually collapsed to a pleated structure.

13. A process for pleating a moving web of flexible material comprising
    delivering a web to be pleated to a pleating device having: a first air feed plenum with an inlet end, an outlet end, and a transversely irregular surface on the first plenum, flat at the inlet end and progressing over the length of the surface to at least one peak at the outlet end; a second air feed plenum with an inlet end, an outlet end, and a transversely irregular surface on the second plenum mating with the surface of the first plenum and juxtaposed in a spaced-apart relation thereto; and a multitude of slots with louvered openings in each irregular surface said louvered openings directed toward the outlet ends providing gas pressure to the air feed plenums adequate to maintain flow of gas through the slots at a velocity greater than the velocity of the web to exert balanced longitudinal pneumatic forces to the web to hold the web under tension applying transverse pleating forces to the web under tension over a predetermined length of the web to collapse the web into a pleated structure moving the web through the pleating device in the direction of the tension to continually apply longitudinal and transverse forces to the moving web whereby the web is continually collapsed to a pleated structure.

* * * * *